(12) United States Patent
Song et al.

(10) Patent No.: US 10,299,269 B2
(45) Date of Patent: May 21, 2019

(54) FLEXIBLE MULTICARRIER NB-IOT OPERATION IN A NETWORK

(71) Applicant: Verizon Patent and Licensing Inc., Arlington, VA (US)

(72) Inventors: Lei Song, Fremont, CA (US); Zheng Zhao, Plainsboro, NJ (US); Jin Yang, Orinda, CA (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 15/251,604

(22) Filed: Aug. 30, 2016

(65) Prior Publication Data
US 2018/0063841 A1    Mar. 1, 2018

(51) Int. Cl.
| | |
|---|---|
| *H04W 72/04* | (2009.01) |
| *H04W 28/08* | (2009.01) |
| *H04W 36/08* | (2009.01) |
| *H04W 4/06* | (2009.01) |
| *H04W 72/10* | (2009.01) |
| *H04W 48/06* | (2009.01) |
| *H04W 4/70* | (2018.01) |

(52) U.S. Cl.
CPC ......... *H04W 72/0453* (2013.01); *H04W 4/06* (2013.01); *H04W 48/06* (2013.01); *H04W 72/042* (2013.01); *H04W 4/70* (2018.02); *H04W 28/085* (2013.01)

(58) Field of Classification Search
CPC . H04W 72/0453; H04W 4/06; H04W 28/085; H04W 36/08; H04W 72/10; H04W 4/70; H04W 4/005
See application file for complete search history.

(56) References Cited

U.S. PATENT DOCUMENTS

2017/0289965 A1* 10/2017 You .................... H04W 56/001
2018/0020452 A1*  1/2018 Yerramalli ........ H04W 56/0015

* cited by examiner

*Primary Examiner* — Luat Phung

(57) ABSTRACT

A base station device may include a processor configured to select one or more anchor Narrow Band Internet of Things (NB-IoT) channels in a frequency band based on frequencies consistent with a user equipment (UE) device raster scan and assign a plurality of supplementary NB-IoT channels in the frequency band based on frequencies aligned with Physical Resource Blocks (PRBs) of the frequency band. The base station may further include a transceiver configured to broadcast information identifying the one or more NB-IoT channels and the plurality of supplementary NB-IoT channels in a system information block (SIB).

20 Claims, 9 Drawing Sheets

FLEXIBLE MULTICARRIER NB-IOT OPERATION IN A NETWORK

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices. For example, a base station may service a large number of wireless devices. A large number of wireless devices may overwhelm the resources of the base station or the wireless access network.

DETAILED DESCRIPTION OF PREFERRED EMBODIMENTS

Figure 1:
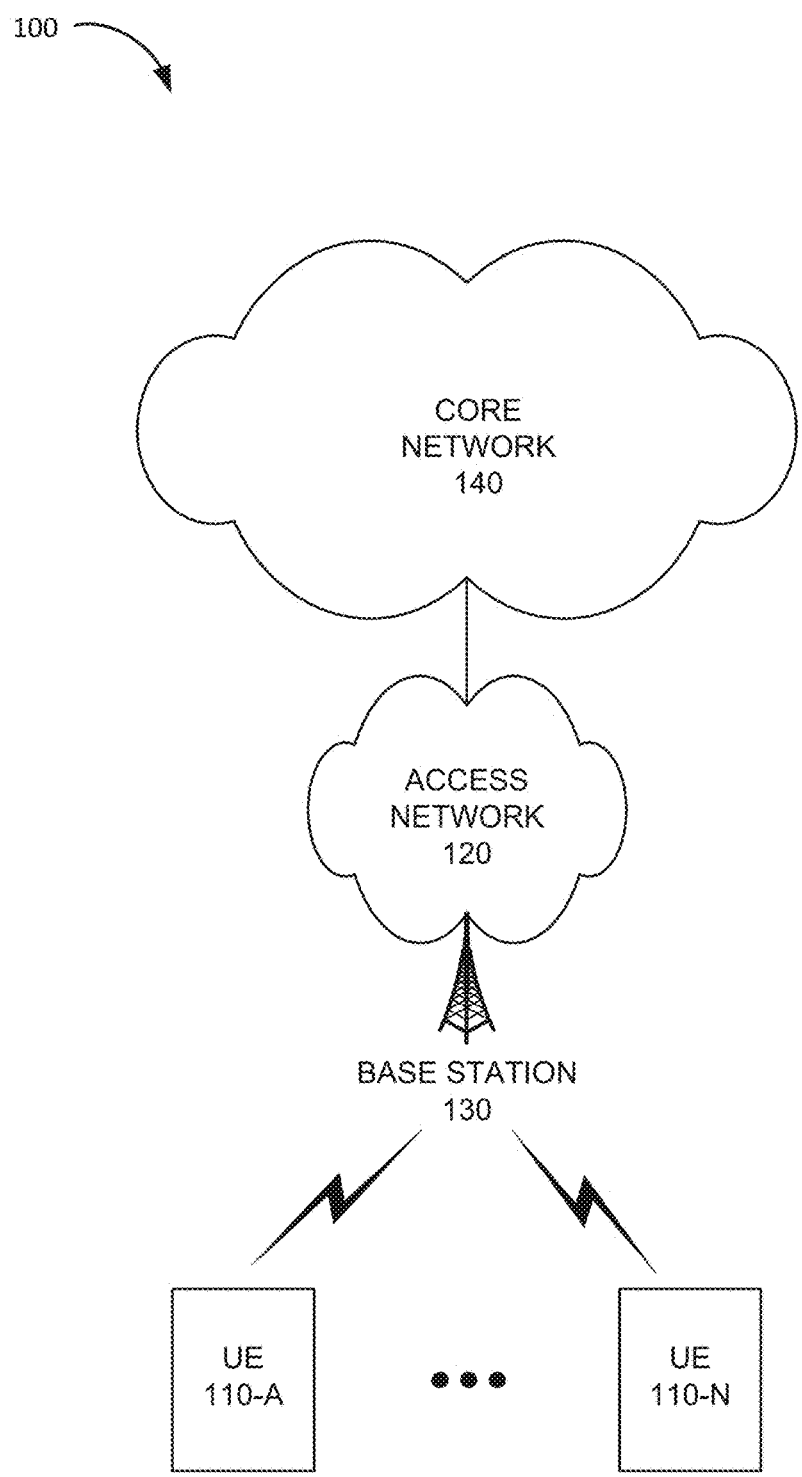
FIG. 1 is a diagram illustrating an environment according to an implementation described herein.

The following detailed description refers to the accompanying drawings. The same reference numbers in different drawings identify the same or similar elements.

A provider of wireless communication services may manage wireless access networks that include a large number of network devices. For example, a wireless access network may provide communication services for devices in Internet of Things (IoT) applications. Such devices may communicate using machine-to-machine (M2M) communication, such as machine-type communication (MTC), a type of M2M communication standardized by the $3^{rd}$ Generation Partnership Project (3GPP), and/or another type of M2M communication. Examples of MTC devices may include utility meters, parking meters, road sensors, environmental sensors, security sensors, traffic and/or road lights, traffic cameras, advertising displays, vehicle telematics devices, point-of-sale terminals, vending machines, health monitoring devices, remote diagnostics devices, access control device, manufacturing controllers, and/or other types of devices. Use of MTC devices are envisioned to increase exponentially and may result in a large number of such devices being serviced by a wireless access network. Estimates indicate that the number of MTC devices within a wireless operator's network may increase to hundreds of millions of devices communicating with each other autonomously with little to no human intervention.

A wireless network, such as a Long Term Evolution (LTE) access network (e.g., an evolved packet core (EPC) network), based on the LTE standard specified by the $3^{rd}$ Generation Partnership Project (3GPP), may use the Evolved Universal Terrestrial Radio Access (E-UTRA) air interface to wirelessly communicate with devices. The bandwidth of an E-UTRA channel in an LTE band may range from about 1.4 to about 20 Megahertz (MHz). In many applications, the data consumption of MTC devices may be small compared to other types of devices, such as mobile phones used for voice communication or for streaming content. Therefore, use of large bandwidth channels, such as an LTE channel, for wirelessly communicating with MTC devices may be an inefficient use of radio link resources.

One technology developed for IoT applications that does not require large amounts of data is the Narrow Band (NB) IoT (NB-IoT) technology. NB-IoT is a Low Power Wide Area (LPWA) technology that uses 200 Kilohertz (KHz) channels, with their own guard bands, for sending small amounts of data. The use of NB-IoT channels may result in better signal penetration in hard to reach areas, such as areas likely to be occupied by MTC devices (e.g., a utility meter installed in a location that shadows or fades wireless signals). Furthermore, the use of NB-IoT channels may result in lower energy consumption and/or cheaper component cost.

An LTE wireless access network may utilize multiple technology types and may function as a hybrid network. For example, the LTE wireless access network may use LTE channels for high data rate communications and NB-IoT channels (also referred to as category Cat-M2) for low data rate communications. Furthermore, some LTE wireless networks may utilize additional technologies for communicating with MTC devices, such as 1.4 MHz wide enhanced MTC (eMTC) channels (also referred to as category Cat-M1) used for MTC communications that require medium data rates.

Base stations in a geographic area may advertise their presence by broadcasting information using channels at particular frequencies. When a UE device seeks to attach to the wireless network, the UE device needs to scan across a frequency range to identify available cells of base stations in the area. The UE device cannot scan each frequency, because scanning all frequencies in a range may take an impractically long time. Therefore, the UE device uses a raster scan to scan across a frequency range using a particular raster rate. For example, a UE device configured for an LTE network may scan across an LTE frequency band in 100 KHz increments. Raster rates used by user equipment (UE) devices in such a hybrid network may not be able to make efficient use of NB-IoT channels.

An LTE channel may include narrow band sub-carriers that carry data modulated using Orthogonal Frequency Division Multiplexing (OFDM). The sub-carriers are offset from a central direct current (DC) sub-carrier that is not modulated to carry data. A particular number (e.g., 12) of sub-carriers may be allocated for a particular number of time slots as a physical resource block (PRB). Thus, when a UE device scans to identify an LTE channel, the UE device needs to identify the carrier center frequency, such as the DC sub-carrier frequency, which must be an integer multiple of the 100 KHz raster scan rate.

An LTE PRB may include 12 sub-carriers of 15 KHz bandwidth for a bandwidth of 180 KHz. Thus, without its guard band, an NB-IoT channel may fit inside a PRB. Therefore, an efficient use of an LTE channel may be to dedicate particular PRBs to particular NB-IoT channels. However, the PRB frequencies may not agree with the UE device raster scan rate resulting in a scan not locating the correct channel.

If the UE device uses the 1.00 KHz raster scan rate to identify NB-IoT channels, a wireless access network may need to select PRBs whose center frequencies physically line up with the raster. For example, the center of PRBs and its closest 100 KHz raster is {2.5, 17.5, 22.5, 37.5, 42.5} KHz offset for the 10 and 20 MHz bands and {7.5, 12.5, 27.5, 32.5, 47.5} KHz offset for 3, 5, and 15 MHz bands. For UE raster scan searches, only PRBs with 2.5 KHz and 7.5 KHz offsets may be used, resulting in only one fifth of PRB locations being available for NR-IoT channels. Furthermore, in such an arrangement, channel continuity may be disrupted for other types of LTE communication and the scheduler may find it difficult to schedule PRBs for high data rate traffic. Furthermore, if the wireless network also makes use of eMTC, the number of PRBs available for NB-IoT channels may be further reduced.

Implementations described herein relate to a flexible multicarrier NB-IoT operation in an LTE band. A base station may select one or more anchor NB-IoT channels in an LTE band based on frequencies consistent with a UE device raster scan and may assign multiple supplementary NB-IoT channels in the LTE band based on frequencies aligned with PRBs of the LTE band. The base station may then broadcast information identifying the one or more anchor NB-IoT channels and the plurality of supplementary NB-IoT channels in a system information block (SIB). In some implementations, the base station may include the NB-IoT channel information in a SIB5. In other implementations, a different SIB may be used (e.g., any of SIB1 to SIB 11).

When a UE device performs a raster scan, the UE device may detect an anchor NB-IoT channel and may obtain the SIB from the base station using the detected anchor NB-IoT channel. The UE device may then retrieve information relating to the one or more anchor NB-IoT channels and the supplementary NB-IoT channels from the SIB being broadcast by the base station and may select one of the anchor or supplementary NB-IoT channels based on information included in the SIB. The UE device may then send a connection request to the base station using the selected NB-IoT channel. For example, if the UE device selects a supplementary NB-IoT channel, the base station may receive the connection request and may attach the LIE device to the wireless access network via the selected supplementary NB-IoT channel.

Specifying the location of supplementary NB-IoT channels in a SIB may enable a UE device to identify the frequencies of the supplementary NB-IoT channels without having to perform a scan and may result in a number of available supplementary NB-IoT channels that is higher than the number of NB-IoT channels that fit into an LTE band based on frequencies consistent with the UE raster scan. For example, in some implementations, each available PRB in an LTE channel may be assigned to an NB-IoT channel. In other implementations, not all PRBs may have an assigned NB-IoT channel. Moreover, in some implementations, one or more NB-IoT channels may be created in a guard band of an LTE carrier band. Providing NB-IoT channels in an LTE guard band may further increase the number of available NB-IoT channels and provide NB-IoT channels that do not interfere with other uses of an LTE band by a wireless access network. In some implementations, multiple NB-IoT channels may be provided in particular a guard band (e.g., on each side of a 10 MHz LTE guard band, etc.).

A UE device may select a particular NB-IoT channel based on information included in the SIB received from the base station. For example, the base station may assign priority values to the anchor and/or supplementary NB-IoT channels and may include information identifying the assigned priority values in the SIB. As another example, the base station may add an access barring instruction for a particular NB-IoT channel barring UE devices from accessing the particular NB-IoT channel.

In some implementations, the base station may perform load balancing on the NB-IoT channels and may assign priority values and/or access barring instructions based on the load balancing. For example, if a particular number of UE devices are using a particular NB-IoT channel, the base station may bar access to the particular NB-IoT channel and/or may assign a low priority to the particular NB-IoT channel. Moreover, if a particular number of UE devices are using a particular NB-IoT channel, the base station may release some of the LIE devices from the particular NB-IoT channel and/or redirect some of the UE devices to other NB-IoT channels. Furthermore, the base station may assign a time period for which the priority values are valid and may include information identifying the assigned time period in the SIB. When the time period has expired, the LIE device may need to reacquire the SIB to determine valid priority values for the NB-IoT channels.

Furthermore, in some implementations, the base station may select one or more of the anchor and/or supplementary NB-IoT channels for a channel hopping communication method and may including information identifying the selected one or more channels and the channel hopping communication method in the SIB.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE devices 110" and individually as "UE device 110"), an access network 120, and a core network 140.

In some implementations, UE device 110 may correspond to an embedded wireless device that communicates wirelessly with other devices over an M2M interface using MTC and/or another type of M2M communication. As an example, UE device 110 may be electrically connected to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

In other implementations, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

Access network 120 may provide access to core network 140 for wireless devices, such as UE device 110. Access network 120 may enable UE device 110 to provide mobile telephone service and/or data services to UE device 110. Access network 120 may establish a packet data network connection between UE device 110 and core network 140. For example, access network 120 may establish an Internet Protocol (IP) connection between UE device 110 and core network 140. In some implementations, access network 120 may include a Long Term Evolution (LTE) access network (e.g., an evolved packet core (EPC) network) based on the LTE standard specified by the $3^{rd}$ Generation Partnership Project (3GPP). In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Access network 120 may include a base station 130 and UE device 110 may wirelessly communicate with access network 120 via base station 130. Base station 130 may service UE devices 110-A to 110-N. In other words, UE devices 110-A to 110-N may be located within the geographic area serviced by base station 130. Base station 130 may broadcast information relating to available NB-IoT channels via which UE devices 110 may wirelessly communicate with access network 120. UE device 110 may communicate with base station 130 via a selected NB-IoT channel.

Base station 130 may be part of an LTE eNodeB base station device. An eNodeB base station device may include one or more devices (e.g., base stations 130) and other components and functionality that allow UE device 110 to wirelessly connect to access network 120. The eNodeB base station device may include or be associated with one or more cells. For example, each cell may include a radio frequency (RF) transceiver facing a particular direction. The eNodeB base station device may interface with access network 120 via an interface referred to as an S1 interface, which may be split into a control plane S1-MME interface to communicate with a Mobility Management Entity (MME) device (not shown in FIG. 1) in access network 120 and a data plane S1-U interface to communicate with core network 140 via a Serving Gateway (SGW) device and/or a Packet Data Network Gateway (PGW) device (not shown in FIG. 1).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP or other standards/protocols and may provide media flows between LIE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
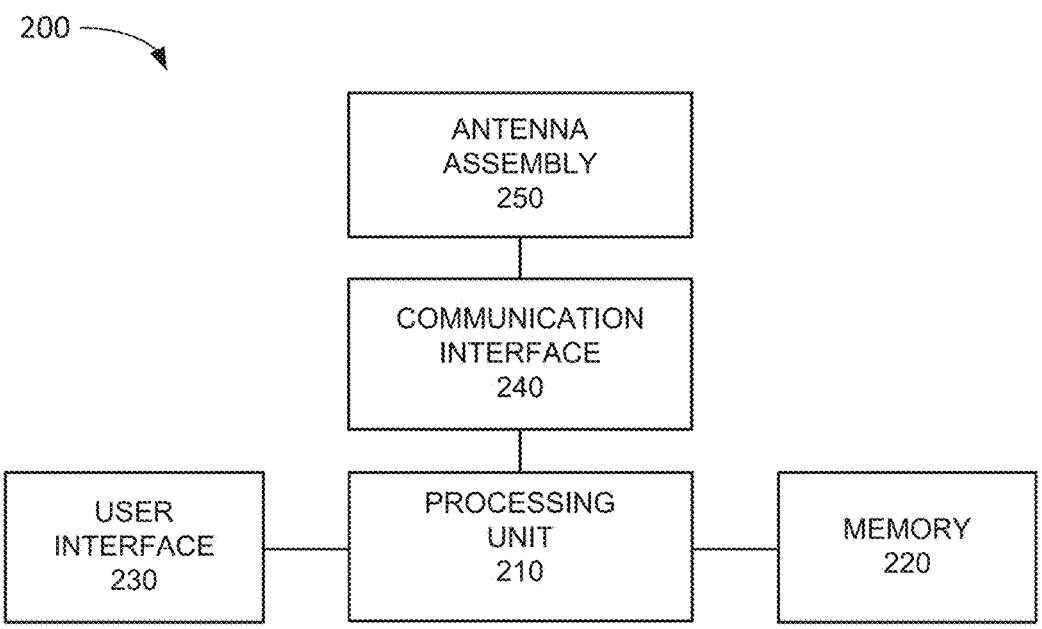
FIG. 2 is a diagram illustrating exemplary components of a device that may be included in a UE device or base station device of FIG. 1.

FIG. 2 is a diagram illustrating exemplary components of device 200 according to an implementation described herein. UE device 110 and/or base station 130 may each include one or more of devices 200. As shown in FIG. 2, device 200 may include a processing unit 210, a memory 220, a user interface 230, a communication interface 240, and an antenna assembly 250.

Processing unit 210 may include one or more single-core or multi-core processors, microprocessors, microcontrollers, application specific integrated circuits (ASICs), field programmable gate arrays (FPGAs), graphical processing units (GPUs), and/or other processing logic. Processing unit 210 may control operation of device 200 and its components.

Memory 220 may include any type of dynamic storage device that may store information and/or instructions, for execution by processing unit 210, and/or any type of non-volatile storage device that may store information for use by processing unit 210. For example, memory 220 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

User interface 230 may allow a user to input information to device 200 and/or to output information from device 200. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a Liquid Crystal Display (LCD), to output visual information; an actuator cause device 200 to vibrate; and/or any other type of input or output device. In some implementations, device 200 may be managed remotely and may not include user interface 230. In other words, device 200 may be "headless" and may not include a display, for example.

Communication interface 240 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to RF signals and/or a receiver that converts RF signals to baseband signals. Communication interface 240 may be coupled to antenna assembly 250 for transmitting and receiving RF signals.

Communication interface 240 may also include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals and receive RF signals and provide them to communication interface 240.

As described herein, device 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Additionally or alternatively, one or more components of device 200 may perform the tasks described as being performed by one or more other components of device 200.

Figure 3:
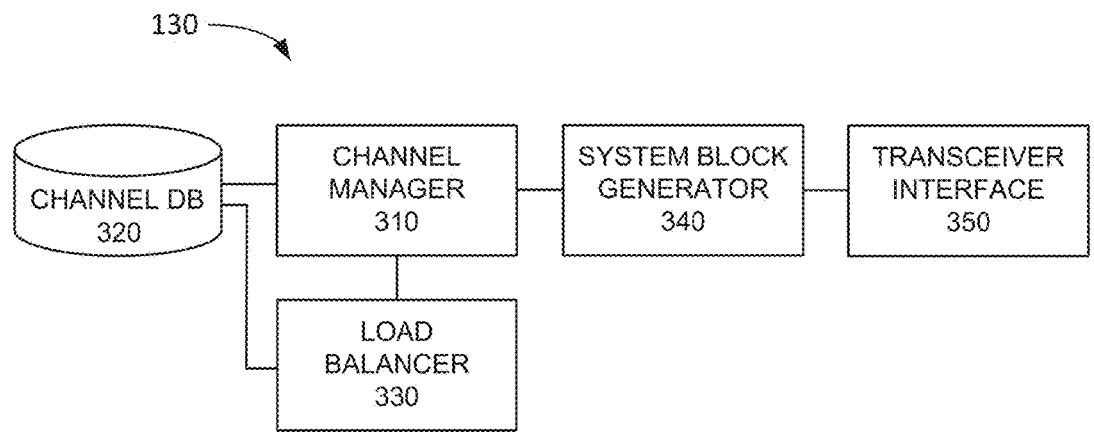
FIG. 3 is a diagram illustrating exemplary functional components of the base station device of FIG. 1.

FIG. 3 is a diagram illustrating exemplary functional components of base station 130 according to an implementation described herein. The functional components of base station 130 may be implemented, for example, via processing unit 210 executing instructions from memory 220. Alternatively, some or all of the functional components of base station 130 may be implemented via hard-wired circuitry (e.g., in a chipset included as part of communication interface 240). As shown in FIG. 3, base station 130 may include a channel manager 310, a channel database (DB) 320, a load balancer 330, a system block generator 340, and a transceiver interface 350.

Channel manager 310 may manage NB-IoT channels used by base station 130. For example, channel manager 310 may assign NB-IoT channels to PRBs in an LTE band and/or in a guard band of an LTE band. Furthermore, channel manager 310 may set access barring and/or priority levels for NB-IoT channels and may keep track of traffic and/or number of UE devices 110 for each NB-IoT channel. Moreover, channel manager 310 may manage a channel hopping scheme for one or more NB-IoT channels. Channel manager 310 may use channel DB 320 in performing its functions.

Channel DB 320 may store information relating to NB-IoT channels used by base station 130. For example, channel DB 320 may include an NB-IoT channel record for each NB-IoT channel. The NB-IoT channel record may store information identifying a particular NB-IoT channel, identifying a center frequency for the particular NB-IoT channel, identifying a particular PRB or a guard band location for the particular NB-IoT channel, identifying a number of LTE devices 110 using the particular NB-IoT channel, identifying an amount of data traffic on the particular NB-IoT channel over a particular time period, identifying one or more signal strength metrics for the particular NB-IoT channel, identifying a communication range for the particular NB-IoT channel, identifying a priority level assigned to the NB-IoT channel, identifying a time period for which the assigned priority level is valid, identifying a frequency hopping scheme associated with the particular NB-IoT channel, and/or identifying other types of information associated with the particular NB-IoT channel.

Load balancer 330 may perform load balancing functions for NB-IoT channels. For example, load balancer 330 may balance data traffic and/or number of UE devices 110 across available NB-IoT channels. Load balancer 330 may assign priority values to particular NB-IoT channels based on load balancing calculations. For example, load balancer 330 may assign a low priority level to an NB-IoT channel with a high volume of data traffic and/or a high number of UE devices 110 and a high priority number to an NB-IoT channel with a low volume of data traffic and/or a low number of UE devices 110.

System block generator 340 may generate a SIB that includes NB-IoT channel information and may provide the generated SIB to transceiver interface 350. Transceiver interface 350 may provide the generated SIB to communication interface 240 for broadcasting.

Although FIG. 3 shows exemplary functional components of base station 130, in other implementations, base station 130 may include fewer functional components, different functional components, differently arranged functional components, or additional functional components than depicted in FIG. 3. Additionally or alternatively, one or more functional components of base station 130 may perform functions described as being performed by one or more other functional components of base station 130.

Figure 4:
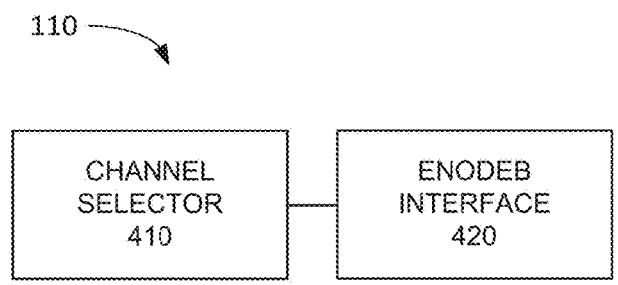
FIG. 4 is a diagram illustrating exemplary functional components of the UE device of FIG. 1.

FIG. 4 is a diagram illustrating exemplary functional components of UE device 110 according to an implementation described herein. The functional components of UE device 110 may be implemented, for example, via processing unit 210 executing instructions from memory 220. Alternatively, some or all of the functional components of UE device 110 may be implemented via hard-wired circuitry (e.g., in a chipset included as part of communication interface 240). As shown in FIG. 4, UE device 110 may include a channel selector 410 and an eNodeB interface 420.

Channel selector 410 may select a particular NB-IoT channel for attaching to access network 120. Channel selector 410 may receive a SIB via eNodeB interface 420, may retrieve NB-IoT channel information from the received SIB, and may select an NB-IoT channel based on the retrieved NB-IoT channel information.

eNodeB interface 420 may be configured to communicate with an eNodeB device that includes base station 130. For example, eNodeB interface 420 may receive a Master Information Block (MIB) from base station 130, may determine a frequency offset from the MIB that corresponds to an anchor NB-IoT channel, and may use the frequency offset to receive one or more SIBs from base station 130. One of the retrieved SIBs (e.g., SIB5) may be designated to include the NB-IoT channel information and channel selector 410 may be configured to recognize and retrieve the NB-IoT channel information from the designated SIB.

Although FIG. 4 shows exemplary functional components of UE device 110, in other implementations, UE device 110 may include fewer functional components, different functional components, differently arranged functional components, or additional functional components than depicted in FIG. 4. Additionally or alternatively, one or more functional components of UE device 110 may perform functions described as being performed by one or more other functional components of UE device 110.

Figure 5:
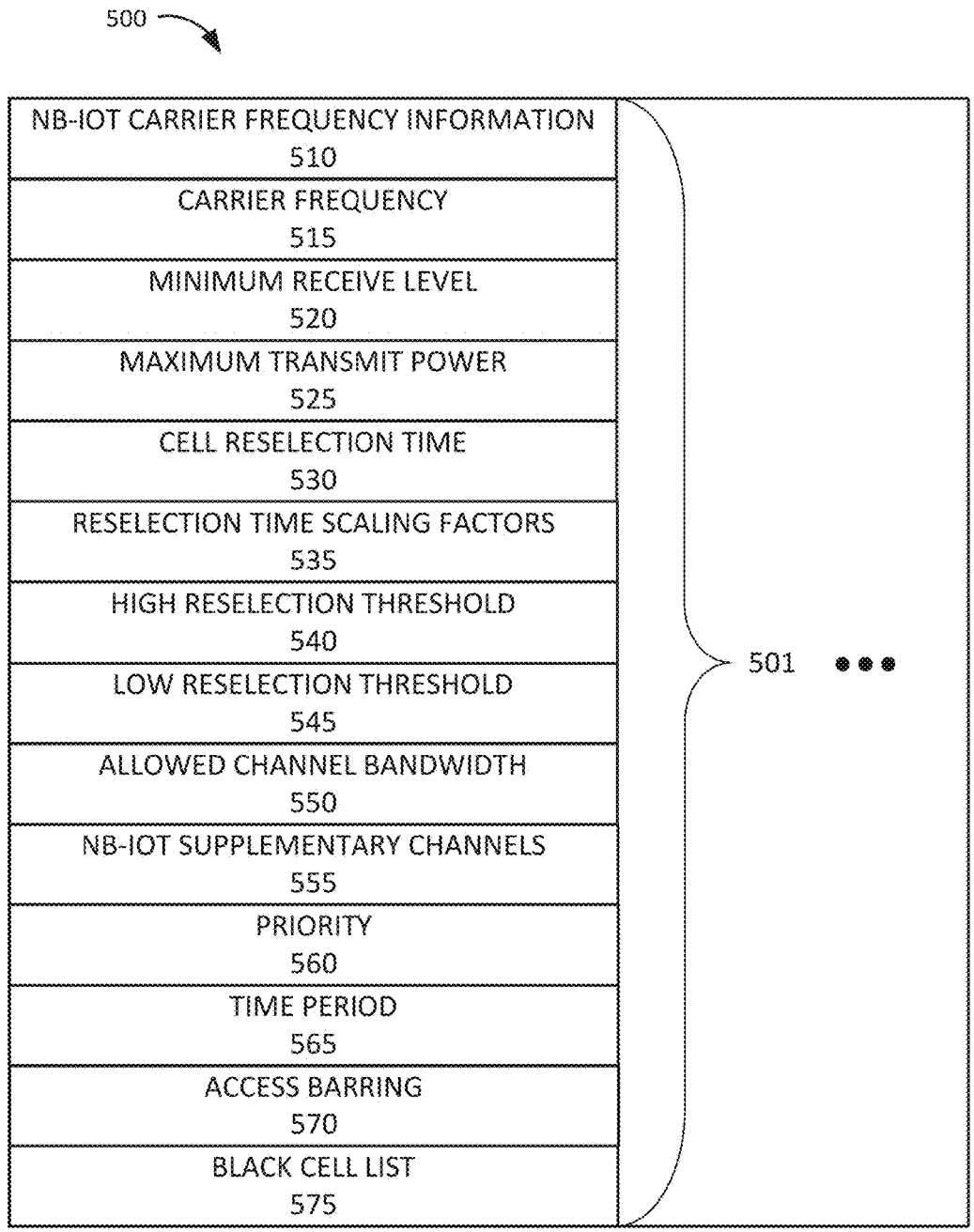
FIG. 5 is a diagram illustrating exemplary components of a system information block that may be broadcast by the base station device of FIG. 1.

FIG. 5 is a diagram illustrating exemplary components of a SIB 500 that may be broadcast by base station 130. In some implementations, SIB 500 may correspond to an LTE SIB5. In other implementations, SIB 500 may correspond to a different type of SIB (e.g., any of SIB1 to SIB13). A SIB5 may be used to provide information relating to inter-frequency neighboring cells. Some of the information in SIB5 may remain unchanged and some information may be modified to carry information relating to NB-IoT channels. As shown in FIG. 5, SIB 500 may include an NB-IoT carrier frequency information field 510, a carrier frequency field 515, a minimum receive level field 520, a maximum transmit power field 525, a cell reselection time field 530, a reselection time scaling factors field 535, a high reselection threshold field 540, a low reselection threshold field 545, an allowed channel bandwidth field 550, an NB-IoT supplementary channels field 555, a priority field 560, a time period field 565, an access barring field 570, and a blacklisted cell list 575.

NB-IoT carrier frequency information field 510 may include information identifying one or more anchor NB-IoT channels, such as information identifying a center frequency for a particular anchor NB-IoT channel, information identifying a particular PRB for the particular anchor NB-IoT channel, and/or other types of information relating to the anchor NB-IoT channel.

Carrier frequency field 515 may include information identifying a carrier frequency used to help UE device 110 search for base station cells. Minimum receive level field 520 may include information identifying a minimum Reference Signal Received Power (RSRP) value of an inter-frequency cell that UE device 110 is to accept before selecting to connect to the cell. Maximum transmit power field 525 may include information identifying a maximum allowed uplink (UL) transmit power of the inter-frequency cell. Cell reselection time field 530 may include information defining a time to trigger cell reselection. Reselection time scaling factors field 535 may include information identifying scaling factors for medium and high mobility. High reselection threshold field 540 may include information identifying a threshold used by UE device 110 for cell re-selection to a higher priority. Low reselection threshold field 545 may include information identifying a threshold used by UE device 110 for cell re-selection to a lower priority. Allowed channel bandwidth field 550 may include information identifying the number of resource blocks associated with a particular channel bandwidth.

NB-IoT supplementary channels field 555 may include information identifying supplementary NB-IoT channels associated with base station 130, such as information identifying a center frequency for a particular supplementary NB-IoT channel, information identifying a particular PRB for the particular supplementary NB-IoT channel, information identifying a particular guard band for the particular supplementary NB-IoT channel, and/or other types of information relating to the supplementary NB-IoT channel.

Priority field 560 may include information identifying priority levels assigned to particular anchor and/or supplementary NB-IoT channels. Time period field 565 may include information identifying a time period for which the priority levels associated with priority field 560 are valid. Access barring field 570 may identify one or more particular anchor and/or supplementary NB-IoT channels to which access is barred during a particular time period. Blacklisted cell list 575 may include information identifying cells that are not to be considered for cell reselection.

Figure 6:
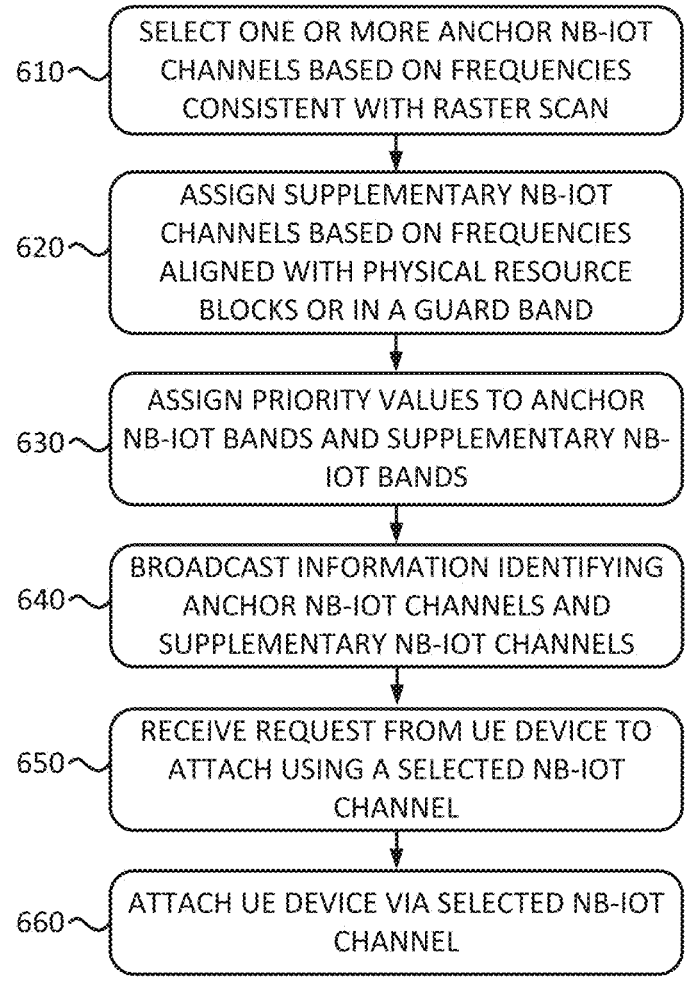
FIG. 6 is a flowchart of a process for managing Narrow Band Internet of Things channels according to an implementation described herein.

FIG. 6 is a flowchart of a process for managing NB-IoT channels according to an implementation described herein. In some implementations, the process of FIG. 6 may be performed by base station 130. In other implementations, some or all of the process of FIG. 6 may be performed by another device or a group of devices separate from base station 130.

The process of FIG. 6 may include selecting one or more anchor NB-IoT channels based on frequencies consistent with a raster scan (block 610). For example, base station 130 may select one or more PRBs with 2.5 KHz or 7.5 KHz offsets from a center frequency of the DC carrier of an LTE band as an anchor NB-IoT channel. Selecting PRBs with a 2.5 KHz or 7.5 KHz offset as a location for anchor NR-IoT channels may enable UE device 110 to detect the anchor NB-IoT channels during a 100 KHz raster scan.

Supplementary NB-IoT channels may be assigned based on frequencies aligned with PRBs or in a guard band (block 620). For example base station 130 may select some or all PRBs that have not been selected as a location for an anchor NB-IoT channel as a location for a supplementary NB-IoT channel. Additionally or alternatively, base station 130 may select one or more locations in a guard band of the LTE band for supplementary NIB-IoT channels.

Priority values may be assigned to the anchor channels and/or supplementary NB-IoT channels (block 630). For example, base station 130 may perform load balancing on the available NB-IoT channels and may assign priority values and/or access barring instructions based on the load balancing. For example, base station 130 may assign a low priority level to an NB-IoT channel with a high volume of data traffic and/or a high number of UE devices 110 and a high priority number to an NB-IoT channel with a low volume of data traffic and/or a low number of UE devices 110. Furthermore, base station 130 may assign a time period for which the priority values are valid. Furthermore, base station 130 may select to release one or more UE devices 110 from a particular NB-IoT channel based on the priority values (e.g., a low priority NB-IoT channel) and/or may redirect one or more UE devices 110 from a first NR-IoT channel to a second NB-IoT channel (e.g., from a low priority NB-IoT channel to a high priority NB-IoT channel).

Additionally or alternatively, base station 130 may select priority values for particular NB-IoT channels based on other criteria. As an example, base station 130 may determine that a particular NB-IoT channel has a higher quality signal during particular time periods and may assign a higher priority to the particular NB-IoT channel during the particular time periods. As another example, base station 130 may assign a low priority to a particular NB-IoT channel during periods of high traffic for other types of LTE communication (e.g., real time traffic) if the particular NB-IoT channel interferes with the other types of LTE communication. As yet another example, an NB-IoT channel may be purchased by a subscription, associated with one or more UE devices 110, for the duration of a particular time period and base station 130 may assign a low priority value (and/or access barring instructions) to the NB-IoT channel while giving UE devices 110 associated with the subscription instructions to ignore the priority value for the NB-IoT channel.

Information identifying the anchor and supplementary channels NR-IoT channels may be broadcast (block 640). For example, base station 130 may generate SIB 500 that includes information relating to the selected anchor NB-IoT channels in NB-IoT carrier frequency information field 510, includes information relating to the assigned supplementary NR-IoT channels in NB-IoT supplementary channels field 555, and includes priority, time period, and/or access barring information in priority field 560, time period field 565, and access barring field 570, respectively. Base station 130 may then broadcast SIB 500 at particular intervals.

A request from a UE device may be received to attach to a selected NR-IoT channel (block 650) and the HE device may be attached via the selected NB-IoT channel (block 660), For example, a UE device 110 may send an attach request using a particular NB-IoT channel, for which information was included in the SIB, and base station 130 may perform an attachment procedure for UE device 110 on the particular NB-IoT channel.

Figure 7:
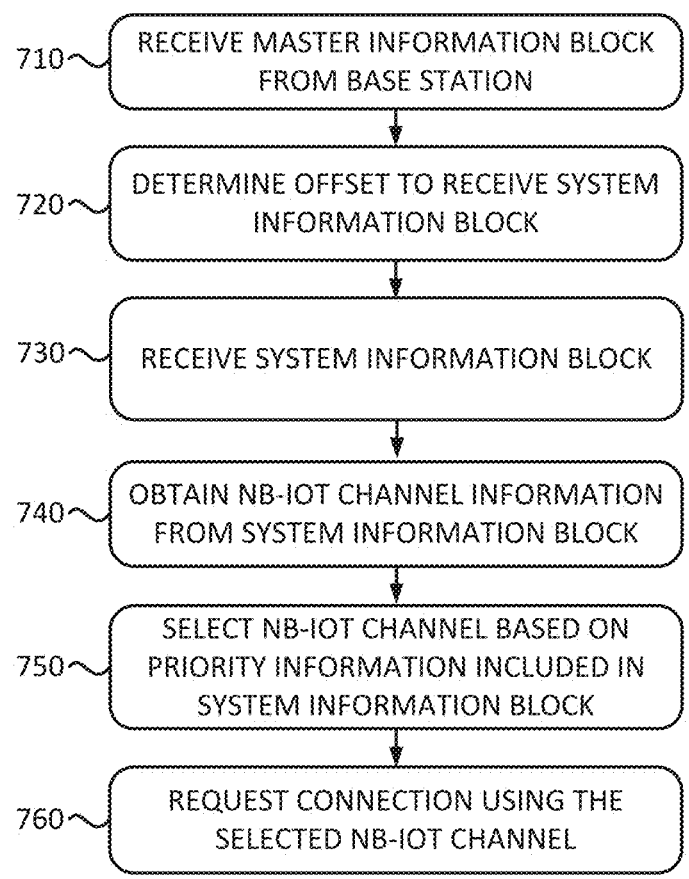
FIG. 7 is a flowchart of a process for obtaining and using Narrow Band Internet of Things channel information according to an implementation described herein.

FIG. 7 is a flowchart of a process for obtaining and using NB-IoT channel information according to an implementation described herein. In some implementations, the process of FIG. 7 may be performed by UE device 110. In other implementations, some or all of the process of FIG. 7 may be performed by another device or a group of devices separate from UE device 110.

The process of FIG. 7 may include receiving a MIB from a base station (block 710) and determining an offset to receive a SIB (block 720). A MIB may be the first information block broadcast by base station 130 and may be broadcast on a Physical Broadcast Channel (PBCH). The MIB may include, among other things, deployment mode information. The deployment mode information may include 8 bits of information that include a raster offset, a PRB index, a system bandwidth, and a same physical cell identifier (PCI) indicator. After performing a cell search and receiving the MIB, UE device 110 may correct the scanning frequency based on the raster offset, which is the offset between the LTE PRBs of base station 130 and the LTE raster scan. After correcting for the offset, UE device 110 may receive one or more SIBs, including a SIB that carries NB-IoT channel information, such as SIB5.

A SIB may be received (block 730) and NB-IoT channel information may be obtained from the received SIB (block 740). For example, UE device 110 may receive SIB5 and may retrieve information relating to anchor and supplementary NB-IoT channels and priority and/or channel barring information relating to the NB-IoT channels from the received SIB5.

An NB-IoT channel may be selected based on priority information included in the SIB (block 750) and a connection may be requested using the selected NB-IoT channel (block 760). For example, in some implementations, UE device 110 may select the NB-IoT channel associated with the highest priority level. In other implementations, UE device 110 may select a particular NB-IoT channel from a group of NB-IoT channels associated with high priority value and/or may exclude NB-IoT channels associated with an access barring instruction. UE device 110 may then send an attachment request to base station 130 using the selected NB-IoT channel and base station 130 may perform an attachment procedure to attach UE device 110 to access network 120. Thus as an example, based on the priority values, UE device 110 may determine that base station device 130 is redirecting UE devices 110 to supplementary NB-IoT channels and search for an available supplementary NB-IoT channel in response. As another example, UE device 110 may determine a preferred supplementary NB-IoT channel during a specified time period based on a highest priority level valid for the specified time period, and use the preferred supplementary NB-IoT channel during the specified time period.

Figure 8:
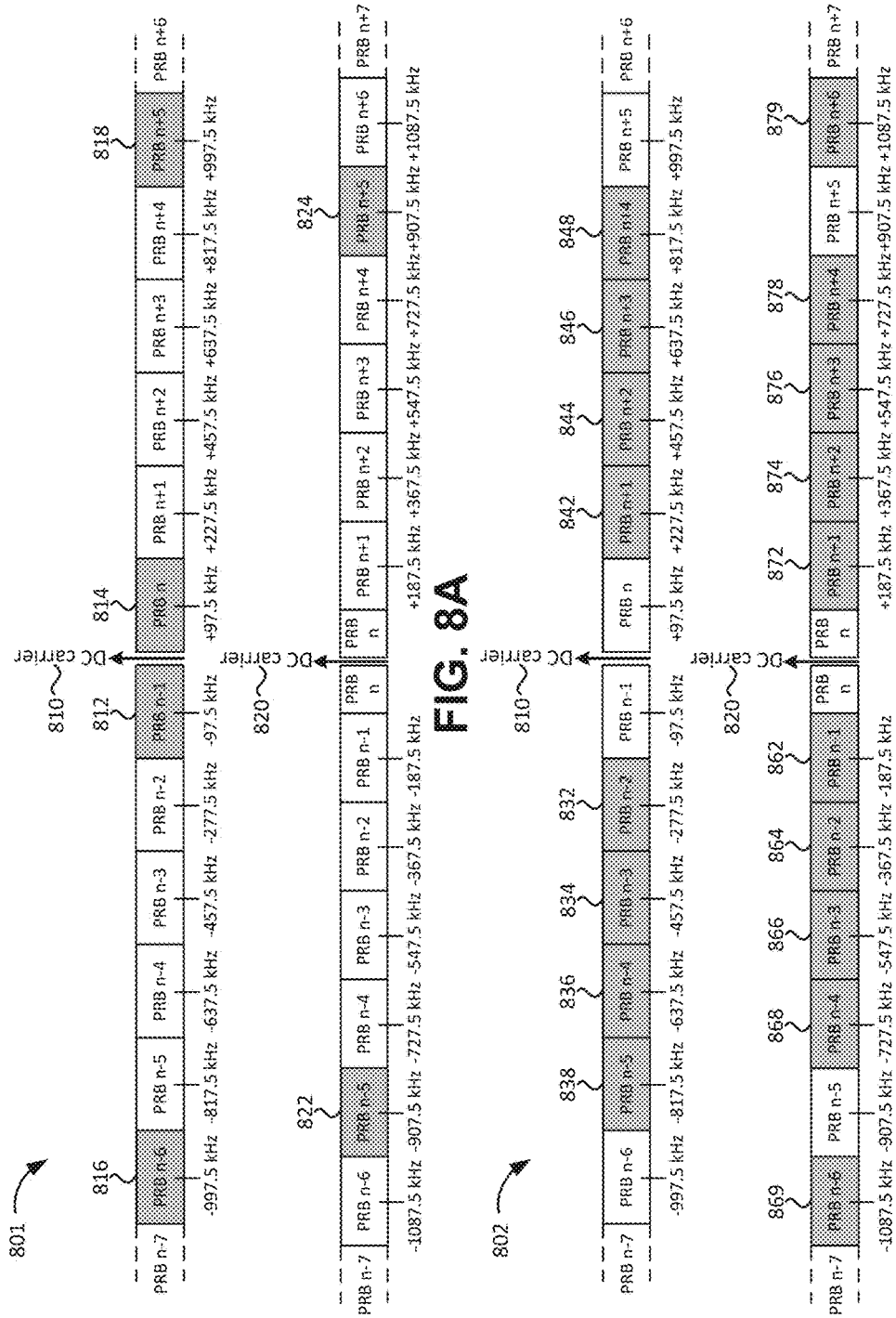
FIGS. 8A and 8B are diagrams of exemplary allocations of Narrow Band Internet of Things channels according to an implementation described herein.

FIGS. 8A and 8B are diagrams of exemplary allocations of NB-IoT channels according to an implementation described herein. FIG. 8A illustrates an anchor NB-IoT channel allocation 801 for a first LTE band 810 with an even number of sub-carriers and an allocation 802 for a second LTE band 820 with an odd number of sub-carriers. LTE band 810 may include PRB blocks 812, 814, 816, and 818 that have center frequencies consistent with an LTE raster scan of 100 KHz. Thus, PRB blocks 812, 814, 816, and 818 may be the only PRB blocks that UE device 110 may detect during a raster scan. Thus, PRB blocks 812, 814, 816, and 818 may be selected for anchor NB-IoT channels.

FIG. 8B illustrates a supplementary NB-IoT channel allocation 802 for first LTE band 810 and second LTE band 820. As shown in FIG. 8B, LTE band 810 may include PRBs 832, 834, 836, 838, 842, 844, 846, and 848 that may be associated with an assigned supplementary NB-IoT channels and LTE band 820 may include PRBs 862, 864, 866, 868, 869, 872, 874, 876, 878, and 879 that may be associated with an assigned supplementary NB-IoT channels. The supplementary NB-IoT channels of LIE bands 810 and 820 may be not be detectable via a UE device 110 LIE raster scan. Therefore, the supplementary NB-IoT channels of LTE bands 810 and 820 may be identified in a SIB5 broadcast by base station 130.

Figure 9:
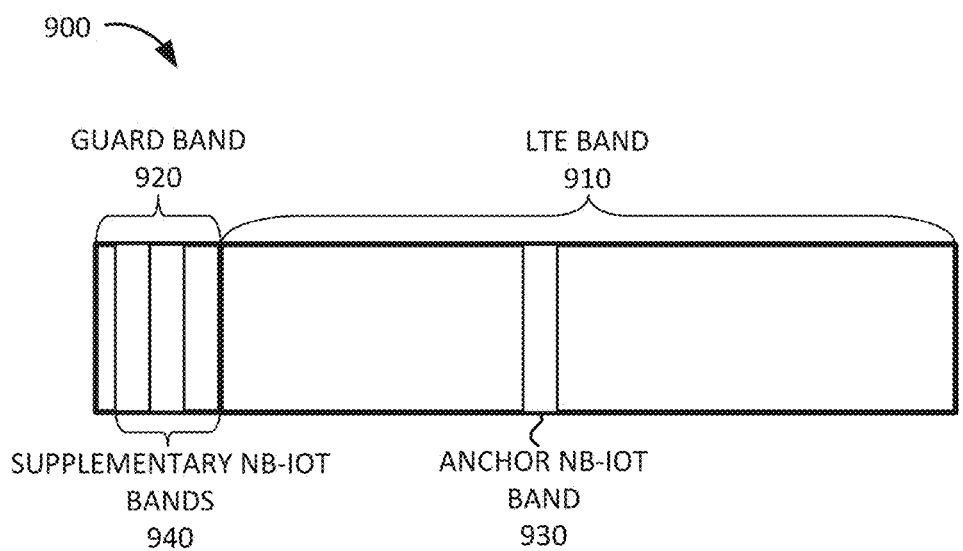
FIG. 9 is a diagram of another exemplary allocation of Narrow Band Internet of Things channels according to an implementation described herein.

FIG. 9 is a diagram of another exemplary allocation 900 of NB-IoT channels according to an implementation described herein. As shown in FIG. 9, allocation 900 includes an LIE band 910 and a guard band 920 located outside of LIE band 910. LTE band 910 includes an anchor NB-IoT channel 930 and guard band 920 includes multiple supplementary NB-IoT bands 940. Anchor NB-IoT channel 930 may be detected by UE device 110 during a raster scan. Supplementary NB-IoT bands 940 located in guard band 920 may not be detectable via a UE device 110 LTE raster scan. Therefore, the supplementary NB-IoT channels 940 may be identified in a SIB5 broadcast by base station 130.

Figure 10:
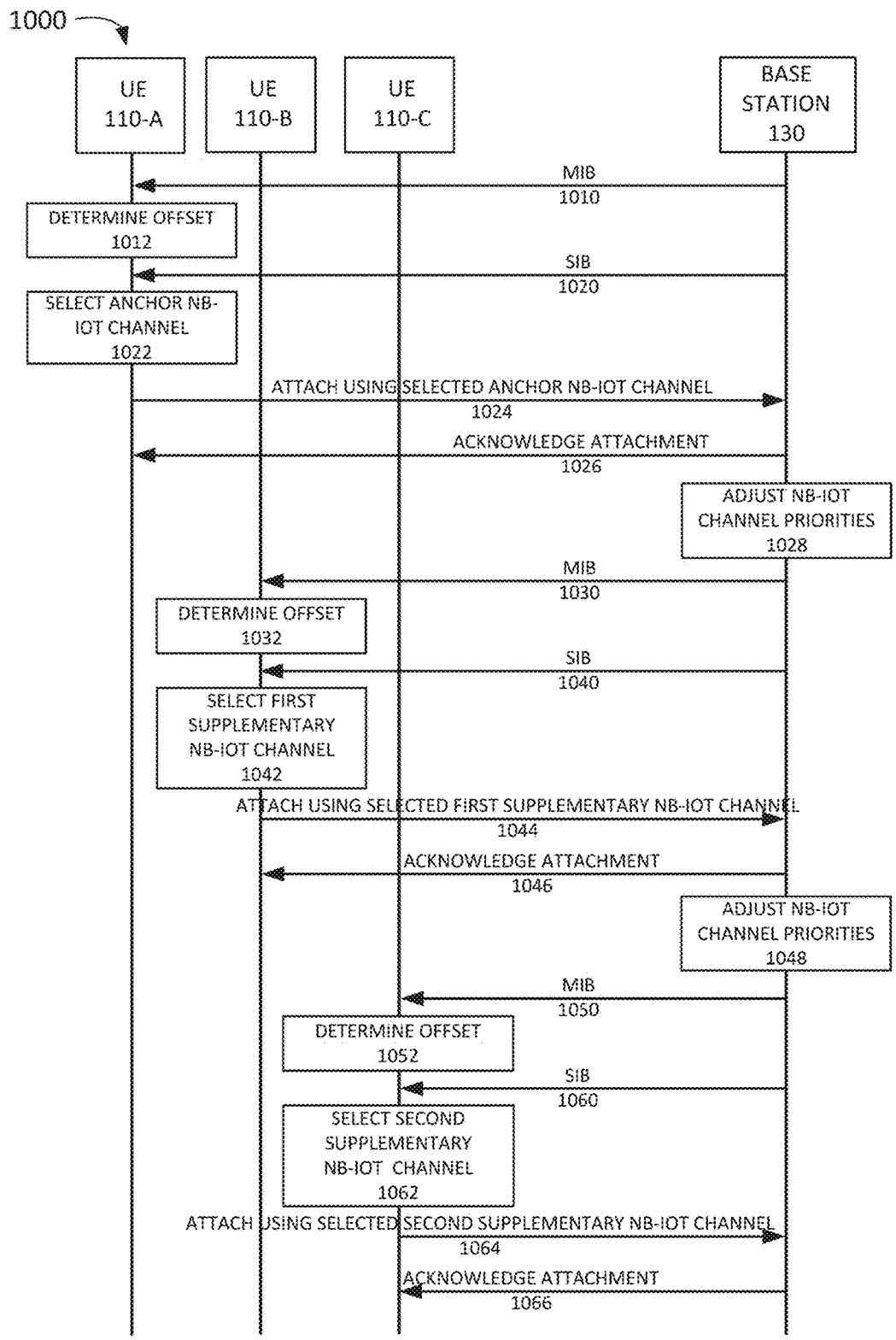
FIG. 10 is a diagram of an exemplary signal flow according to an implementation described herein.

FIG. 10 is a diagram of an exemplary signal flow 1000 according to an implementation described herein. Signal flow 1000 may include base station 130 broadcasting a MIB (signal 1010) and a SIB (signal 1020). UE device 110-A may receive the MIB and may determine an offset (block 1012) between a raster scan and PRBs of base station 130. UE device 110-A may use the offset to detect an anchor NB-IoT channel and may use the anchor NB-IoT channel to receive one or more SIBs being broadcast by base station 130.

Assume no UE devices 110 have attached to base station 130 and that base station 130 has not assigned priority values to NB-IoT channels. Thus, UE device 110-A may select an anchor NB-IoT channel (block 1022), may attach using the selected anchor NB-IoT channel (signal 1024), and base station 130 may acknowledge successful attachment (signal 1026). In response, base station 130 may adjust NB-IoT channel priorities (block 1028). For example, base station 130 may assign a low priority value to the anchor NB-IoT channel to prevent other UE devices 110 from selecting the anchor NB-IoT channel for attachment.

Base station 130 may continue to broadcast the MIB and SIB at particular intervals (signals 1030 and 1040). At a later time, UE device 110-B may receive the MIB and may determine the offset (block 1032), use the offset to detect an anchor NB-IoT channel, and may use the anchor NB-IoT channel to receive one or more SIBs being broadcast by base station 130.

UE device 110-B may select a first supplementary NB-IoT channel (block 1042) because the anchor NB-IoT channel has an associated low priority value. UE device 110-B may then attach using the selected first supplementary NB-IoT channel (signal 1044), and base station 130 may acknowledge successful attachment (signal 1046). In response, base station 130 may adjust NB-IoT channel priorities (block 1048). For example, base station 130 may assign a low priority value to the first supplementary NB-IoT channel to prevent other UE devices 110 from selecting the first supplementary NB-IoT channel for attachment.

Base station 130 may continue to broadcast the MIB and SIB at particular intervals (signals 1050 and 1060). At a later time, UE device 110-C may receive the MIB and may determine the offset (block 1052), use the offset to detect an anchor NB-IoT channel, and may use the anchor NB-IoT channel to receive one or more SIBs being broadcast by base station 130.

UE device 110-C may select a second supplementary NB-IoT channel (block 1062) because the anchor NB-IoT channel and the first supplementary NB-IoT channel have associated low priority values. UE device 110-C may then attach using the selected second supplementary NB-IoT channel (signal 1064), and base station 130 may acknowledge successful attachment (signal 1066).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signal flows has been described with respect to FIG. 10, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   selecting, by a base station device, one or more anchor Narrow Band Internet of Things (NB-IoT) channels in a frequency band based on frequencies consistent with a user equipment (UE) device raster scan;
   assigning, by the base station device, a plurality of supplementary NB-IoT channels in the frequency band based on frequencies aligned with Physical Resource Blocks (PRBs) of the frequency band, wherein a quantity of the plurality of supplementary NB-IoT channels is greater than a quantity of NB-IoT channels that fit into the frequency band based on the frequencies consistent with the UE device raster scan; and broadcasting, by the base station device, information identifying the one or more anchor NB-IoT channels and the plurality of supplementary NB-IoT channels in a system information block (SIB).

2. The method of claim 1, wherein the frequency band includes a Long Term Evolution (LTE) band.

3. The method of claim 1, further comprising:
receiving a connection request from a UE device via a supplementary NB-IoT channel of the plurality of supplementary NB-IoT channels; and
attaching the UE device to the base station device via the supplementary NB-IoT channel.

4. The method of claim 1, wherein the frequency band includes a Long Term Evolution (LTE) band, and wherein at least one of the plurality of supplementary NB-IoT channels is in a guard band associated with the LTE band.

5. The method of claim 1, further comprising:
assigning priority values to the one or more anchor NB-IoT channels and to the plurality of supplementary NB-IoT channels; and
including information identifying the assigned priority values in the SIB.

6. The method of claim 5, further comprising:
assigning a time period for which the priority values are valid; and
including information identifying the assigned time period in the SIB.

7. The method of claim 1, further comprising:
performing load balancing on the one or more anchor NB-IoT channels and the plurality of supplementary NB-IoT channels; and
including access barring instructions for at least one of the one or more anchor NB-IoT channels or the plurality of supplementary NB-IoT channels in the SIB based on the load balancing or instructions to release or redirect one or more UE devices from the one or more anchor NB-IoT channels or the plurality of supplementary NB-IoT channels.

8. The method of claim 1, further comprising:
selecting one or more channels from the one or more anchor NB-IoT channels or the plurality of supplementary NB-IoT channels for a channel hopping communication method; and
including information identifying the selected one or more channels and the channel hopping communication method in the SIB.

9. The method of claim 1, wherein the SIB corresponds to LTE SIBS.

10. A base station device comprising:
a processor configured to:
select one or more anchor Narrow Band Internet of Things (NB-IoT) channels in a band based on frequencies consistent with a user equipment (UE) device raster scan; and
assign a plurality of supplementary NB-IoT channels in the band based on frequencies aligned with Physical Resource Blocks (PRBs) of the band, wherein a quantity of the plurality of supplementary NB-IoT channels is greater than a quantity of NB-IoT channels that fit into the frequency band based on the frequencies consistent with the UE device raster scan; and a transceiver configured to:
broadcast information identifying the one or more anchor NB-IoT channels and the plurality of supplementary NB-IoT channels in a system information block (SIB).

11. The base station device of claim 10, wherein the band includes a Long Term Evolution (LTE) band.

12. The base station device of claim 10, wherein the processor is further configured to:
receive a connection request from a UE device via a supplementary NB-IoT channel of the plurality of supplementary NB-IoT channels; and
attach the UE device to the base station device via the supplementary NB-IoT channel.

13. The base station device of claim 10, wherein the band includes a Long Term Evolution (LTE) band, and wherein at least one of the plurality of supplementary NB-IoT channels is in a guard band associated with the LTE band.

14. The base station device of claim 10, wherein the processor is further configured to:
assign priority values to the one or more anchor NB-IoT channels and to the plurality of supplementary NB-IoT channels; and
include information identifying the assigned priority values in the SIB.

15. The base station device of claim 14, wherein the processor is further configured to:
assign a time period for which the priority values are valid; and
include information identifying the assigned time period in the SIB.

16. The base station device of claim 10, wherein the processor is further configured to:
perform load balancing on the one or more anchor NB-IoT channels and the plurality of supplementary NB-IoT channels; and
include access barring instructions for at least one of the one or more anchor NB-IoT channels or the plurality of supplementary NB-IoT channels in the SIB based on the load balancing.

17. The base station device of claim 10, wherein the processor is further configured to:
select one or more channels from the one or more anchor NB-IoT channels or the plurality of supplementary NB-IoT channels for a channel hopping communication method; and
include information identifying the selected one or more channels and the channel hopping communication method in the SIB.

18. A system comprising:
a base station device configured to:
select one or more anchor Narrow Band Internet of Things (NB-IoT) channels in a Long Term Evolution (LTE) band based on frequencies consistent with a user equipment (UE) device raster scan;
assign a plurality of supplementary NB-IoT channels in the LTE band based on frequencies aligned with Physical Resource Blocks (PRBs) of the LTE band, wherein a quantity of the plurality of supplementary NB-IoT channels is greater than a quantity of NB-IoT channels that fit into the frequency band based on the frequencies consistent with the UE device raster scan; and
broadcast information identifying the one or more anchor NB-IoT channels and the plurality of supplementary NB-IoT channels in a system information block (SIB); and a UE device configured to:
receive the SIB;
select an NB-IoT channel based on the information in the SIB; and
connect to the base station device using the selected NB-IoT channel.

19. The system of claim 18, wherein, when selecting the NB-IoT channel based on the information in the SIB, the UE device is further configured to:
determine that the base station device is redirecting UE devices to the plurality of supplementary NB-IoT channels; and
search for an available supplementary NB-IoT channel, in response to determining that the base station device is redirecting UE devices to the plurality of supplementary NB-IoT channels.

20. The system of claim 18, wherein, when selecting the NB-IoT channel based on the information in the SIB, the UE is further configured to:
determine a preferred supplementary NB-IoT channel and a specified time period based on information stored in the SIB; and
use the preferred supplementary NB-IoT channel during the specified time period.

* * * * *